United States Patent
Krempl

(10) Patent No.: US 7,030,835 B2
(45) Date of Patent: Apr. 18, 2006

(54) METHOD FOR PRESENTING INFORMATION TO AN AUDIENCE

(75) Inventor: Stephen F. Krempl, Louisville, KY (US)

(73) Assignee: TriZenter, LLC, Louisville, KY (US)

( * ) Notice: Subject to any disclaimer, the term of this patent is extended or adjusted under 35 U.S.C. 154(b) by 163 days.

(21) Appl. No.: 10/222,354

(22) Filed: Aug. 16, 2002

(65) Prior Publication Data

US 2003/0052835 A1 Mar. 20, 2003

Related U.S. Application Data

(63) Continuation-in-part of application No. 10/090,355, filed on Mar. 1, 2002.

(51) Int. Cl.
*G09G 5/00* (2006.01)

(52) U.S. Cl. .................... 345/1.1; 345/1.2; 345/1.3

(58) Field of Classification Search .......... 345/1.1–1.3, 345/173, 30, 99, 204, 212, 213, 502, 507–509, 345/512, 521, 744; 348/500–512; 178/18–20; 715/716; 434/38, 44
See application file for complete search history.

(56) References Cited

U.S. PATENT DOCUMENTS

| | | | | |
|---|---|---|---|---|
| 4,740,779 A * | 4/1988 | Cleary et al. .................. 345/7 |
| 5,300,943 A * | 4/1994 | Jakobs et al. ................ 345/1.1 |
| 5,634,018 A * | 5/1997 | Tanikoshi et al. ............ 715/751 |
| 5,949,437 A * | 9/1999 | Clark .......................... 345/502 |
| 6,190,172 B1 * | 2/2001 | Lechner ....................... 434/44 |
| 6,262,695 B1 * | 7/2001 | McGowan .................. 345/1.1 |
| 6,362,797 B1 * | 3/2002 | Dehmlow .................... 345/32 |
| 6,814,578 B1 * | 11/2004 | Vorst .......................... 434/38 |
| 6,850,252 B1 * | 2/2005 | Hoffberg .................... 715/716 |
| 2001/0003846 A1 * | 6/2001 | Rowe et al. .................. 725/47 |
| 2001/0040671 A1 * | 11/2001 | Metcalf ....................... 353/94 |
| 2002/0044103 A1 * | 4/2002 | Paulson ...................... 345/1.1 |
| 2002/0101392 A1 * | 8/2002 | Hughes et al. .............. 345/1.1 |
| 2002/0126129 A1 * | 9/2002 | Snyder et al. ............. 345/582 |
| 2002/0135536 A1 * | 9/2002 | Bruning ..................... 345/1.1 |
| 2003/0113096 A1 * | 6/2003 | Taira et al. .................. 386/46 |
| 2003/0164806 A1 * | 9/2003 | Krempl ..................... 345/1.1 |
| 2003/0206194 A1 * | 11/2003 | Boyd ......................... 345/744 |

* cited by examiner

*Primary Examiner*—Vijay Shankar
*Assistant Examiner*—Prabodh Dharia
(74) *Attorney, Agent, or Firm*—Stites & Harbison, PLLC; David W. Nagle, Jr.

(57) ABSTRACT

A method of presenting information to an audience. The method includes the step of determining the specific information which the presenter desires to convey to an audience. The presenter determines an organizational framework on which to divide the information. The information is then chunked into groupings based on the organizational framework. Each grouping is then displayed on a specific, separate display for dissemination to the audience based on the determined organizational framework. Preferably, the information is displayed on three displays. Each grouping of information and its associated position on a display is explained to the audience for maximum effect.

16 Claims, 3 Drawing Sheets

US 7,030,835 B2

METHOD FOR PRESENTING INFORMATION TO AN AUDIENCE

RELATED APPLICATION

This application is a continuation-in-part of a co-pending U.S. patent application (Ser. No. 10/090,355, entitled "System and Method for Presenting Information on a Plurality of Displays," filed Mar. 1, 2002 in the name of Stephen F. Krempl, which is hereby incorporated in its entirety by reference herein.

BACKGROUND OF THE INVENTION

1. Technical Field of the Invention

This invention relates to methodologies on the presentation of information, and more particularly, to a method of presenting information to an audience by utilizing at least three presentation displays.

2. Description of Related Art

With the advent of computers and its resultant Information Age, far more information has become available to people than can be easily absorbed. Various types of communications, from newspapers to the Internet, have enabled people to receive this vast amount of data. However, although more data is provided to people, there have been no new instructional techniques created to accommodate absorbing all this available information. Existing methodologies and presentation systems utilize flip charts, monitors, overhead projectors, LCD projectors and video divides. Although these devices present the data for people, there are several limitations. Specifically, the existing devices merely transmit data to people, but add no additional value to the learning equation. Existing presentation systems do not separate or catagorize the information to aid the recipients of the information in remembering the data in a manner in which people naturally retain the information.

Existing systems typically utilize one single presentation display, such as a screen, for presenting information to the audience. By presenting information on a single level to the audience, the dissemination and absorption of the information is limited. It has been found in studies conducted in regards to neurolinguistic sciences, that an individual perceives his world on an internal visual screen which exists in front of the individual. Upon this internal screen is a perceptual map on which information is organized. A method is needed which maximizes the presentation of information in such a fashion as to optimize receipt and retention of the presented information on an individual's internal screen. Co-pending U.S. patent application Ser. No. 09/689,573 ('573) discloses a multi-screen presentation system. The presentation system provides three or more displays for the presentation of information to the audience. However, '573 does not disclose the method necessary to effectively present information to an audience. A method is needed which enables a person to effectively retain presented information through the use of these multiple displays.

Thus, it would be a distinct advantage to have a method which optimizes the presentation of information through the use of multiple display screens. Additionally, a method is needed which enables one person to operate multiple displays for presentation to an audience. It is an object of the present invention to provide such a method.

SUMMARY OF THE INVENTION

In one aspect, the present invention is a method of presenting information to an audience by a presenter. The method begins by determining by the presenter, the information which is to be conveyed to the audience. Next, the organizational framework of a presentation of the information is determined. The information is then chunked in accordance with the organization framework for display on a plurality of displays. Next, the information is presented to the audience by displaying the information on the plurality of displays based on the determined organizational framework.

In another aspect, the present invention is a method of presenting information to an audience by a presenter on a multi-screen presentation system. The method begins by the presenter determining information to be conveyed to the audience. Next, an organizational framework is determined for use in conveying the information to the audience. Next, the information is chunked into a plurality of groupings based on the determined organizational framework. The presenter then explains the organizational framework to the audience, indicating which information is to be display on each display. The information is then displayed to the audience on the multi-screen presentation. The multi-screen presentation system includes a computing system which receives information for presentation. The computing system formats the information into a plurality of data packets. Each data packet indicates a final destination designated from the received information. The presentation system also includes a switch box communicating with the computing system. The switch box receives a plurality of data packets sent from the computing system and determines a destination of each data packet. The switch box includes a separation module for dividing data packets into groups based on a designated destination and a diversion module for determining the designated destination for each data packet received from the computing system. In addition, the presentation system includes a plurality of display screens for displaying information inputted into the computing system. The display screens are in communication with the switch box. The switch box, upon determining the destination of each data packet, sends the data packet to the designated display screen.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1A:
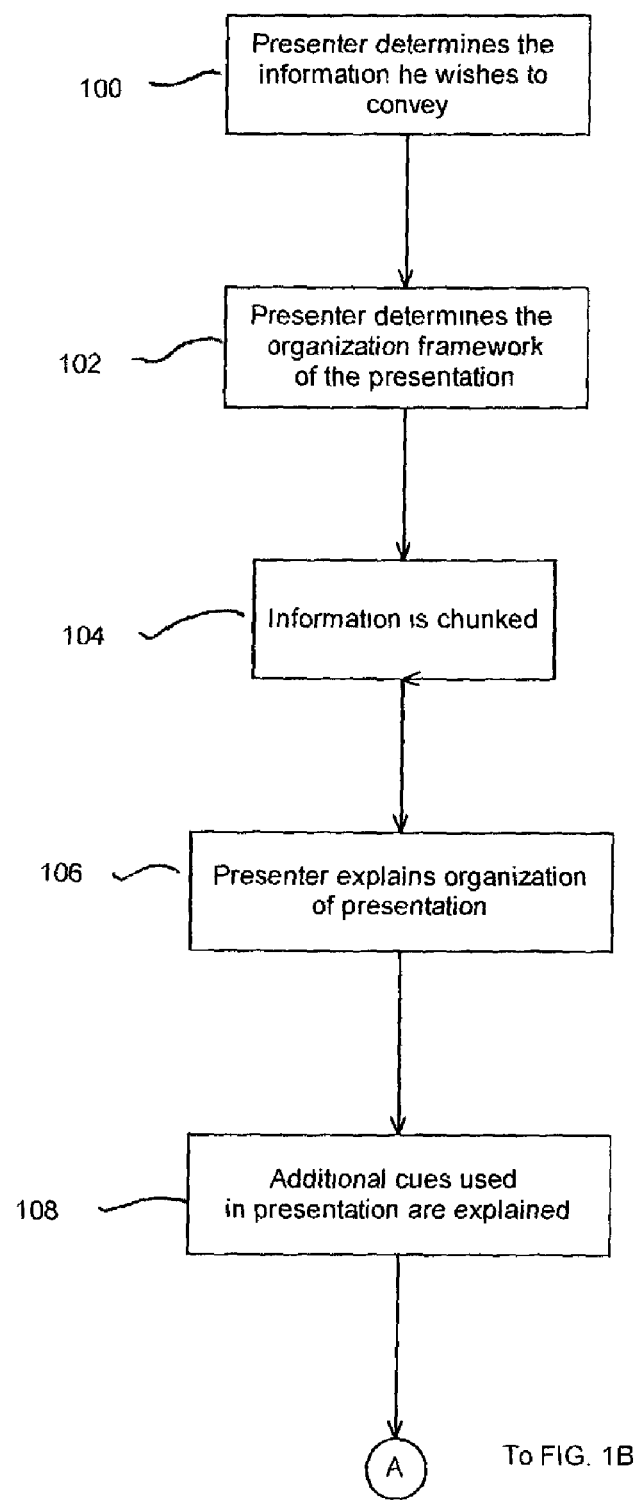
FIGS. 1A–1B are flow charts outlining the steps for presenting information to an audience according to the teachings of the present invention.

A method of effectively presenting information to an audience is disclosed. As discussed above, the advent of the Information Age has brought more information than can possibly be absorbed. However, the number and kind of instructional mediums has not changed in many years. These mediums are adequate for presenting information. However, the way these mediums are currently used has limitations. They can project an image onto a screen, but the devices do not add value to the communications/learning equation. These presentation devices do not separate or categorize the information to aid the audience in remembering the important elements of the presentation. In addition, the devices do not enable one presenter to present information on multiple displays without additional personnel controlling the devices. The disclosed invention provides a presentation methodology utilizing existing and future presentation devices. Additionally, the disclosed invention provides a methodology of presenting data on a multi-screen presentation system operated by only one person.

Visual recognition and processing is a crucial development in the evolutionary process of humans. The newly developed field of cognitive neuroscience has studied how human evolution, both physically and mentally, creates present day abilities and needs. It is believed that humans have a more highly developed visual sense than the senses of hearing, feeling, smell or taste. This sense is crucial in the development of attention to, and discrimination in, the environment in which early man developed. Because of this, most information is presented in a visual manner, and, in fact, research indicates that during the communication process itself, most information is gained through the visual sense.

Another aspect of the visual process that information scientists and educational psychologists have been exploring for some time involves relative processing speed of different kinds of sensory data. Some processing is linear and sequential, by its nature, while other processes may be simultaneous and holistic. For example, simply talking to someone else is limited to speaking one word at a time. These words, in the proper sequence, convey a fully formed idea, but the path to that idea is a linear, sequential one. The same also occurs with someone performing a series of physical movements. For example, a person engaged in building or repairing something. These physical movements are also linear, sequential operations. These types of operations, mental or physical, are limited in speed because one step cannot begin prior to the completion of the preceding step.

Visual processing, in contrast, is simultaneous and holistic. It is possible to see an entire picture or visual image at once. In fact, it is possible to simultaneously see a number of visual images, provided that they are at the proper distance and position relative to the viewer. This makes visual transfer and processing of information much faster than either auditory (sounds and words) or kinesthetic (feelings and movements).

The relatively recently developed field of Neuro-Linguistic Programming (NLP) has taken the ideas of many fields with a number of useful and sophisticated, yet simple to apply, techniques of association. The stimuli used can be any individual image, sound or touch, or a combination thereof. The process is based on naturally occurring processes in human beings, related to human evolution development discussed above.

The main features of these existing techniques with groups involve carefully placing visual images in front of the observing audience, and combining these carefully chosen and placed images with words or other sounds to create the desired associations. The visual images can also include the presenter, as well as visual aids such as flip charts or computer projections, slide shows, etc. The presenter's verbal input, combined with other sounds or music can create lasting, useful stimuli called anchors. These anchors, when applied skillfully, can then be used by the presenter to accomplish a number of useful objectives. These objectives include controlling states of mind, sequencing specific information, stimulating a specific memory or thought, and replacing one thought or image with another. All of this can be done successfully with groups of people viewing a presentation in a corporate, training, or educational setting. Success relies on effectively sorting information out, into the space being viewed by the audience, in such a way that each viewer can distinguish separate pieces of information, and effectively make individual associations for each. The presenter thus has access to the information simply by conscious use of the position of each presentation item. This process is called spatial sorting.

The disclosed invention combines some of the above-referenced theories for application to audiences. In studies conducted in neurolinguistic sciences, it has been found that people perceive their worlds based on an internal visual screen that is in front of them. The internal screen includes a perceptual map on which received information is organized.

The disclosed invention optimizes the retention of information by an audience by organizing and presenting the information in such a manner as to accommodate the organization of received information on the internal screen of each individual. In the preferred embodiment of the present invention, the presenter organizes the information he wishes to convey, into three groupings for display on three visual displays. Each display may be any device which allows a visual presentation of information to any audience, such as a monitor, a video screen, flip charts, etc. By utilizing three screens and organizing the information on the three screens, an individual is aided in recalling the display information because the information is displayed where the individual naturally would look for the information on their internal perceptual map.

The information for which the presenter wishes to convey to an audience must be divided into parts easily perceived by the audience. In the method to be discussed below, the information must be divided up or "chunked" into groups of data allowing maximum attention, retention and assimilation of the presented information. Preferably the information is chunked into three parts, one part for each display. The displays may be organized in a space orientation for the audience (e.g., left, center, and right). This space orientation may take the form of a time line going from left to right of the room or any orientation that leads to assigning one particular kind of information to each screen. Table A below illustrates several ways information may be divided into three displays.

TABLE A

| Left Screen | Center Screen | Right Screen |
| --- | --- | --- |
| Status | Gap | Expectation |
| Yesterday | Today | Tomorrow |
| Last year | Year to Date | Forecast |
| Past Performance | Present Performance | Expected Performance |
| What | So what? | Now what? |
| Problem | Possible resolution | Action required |
| Facts | New Procedure (video) | New Behaviors |
| Product Photo | Video Demonstration | Product specifications |
| Camera angle 1 | Camera angle 2 | Camera angle 3 |
| Product | Competing Product | Another competing product |
| Summary Points | Video | Application Questions |
| Product A | Product B | Product C |

In the disclosed method, the presenter divides the information and presents the information according to the framework such as illustrated in Table A. Although Table A provides some examples of preferred groupings of information, other logical divisions of information may be employed to effectively present information to an audience. The presenter, prior to beginning the presentation, establishes the organizational framework of the three displays to the audience. Specifically, the presenter also preferably physically "walks" through each display, left to right. In front of each display, the presenter explains to the audience what type of information each display will present. For example, the presenter may state that the left screen displays past information, the center screen displays present information and the right screen displays for future information. To reinforce the organization of the displays, the presenter should quickly identify the purpose of each display a second time.

Additionally, the presenter may utilize specific cues to indicate specific meaning within the presentation. For example, a sound effect, color or hand gesture may provide a secondary meaning to the audience on a particular piece of information. These additional cues are used to reinforce specific types of information to the audience. Prior to beginning the presentation, if these additional cues are used, the presenter explains the meaning of the cues.

Figure 1B:
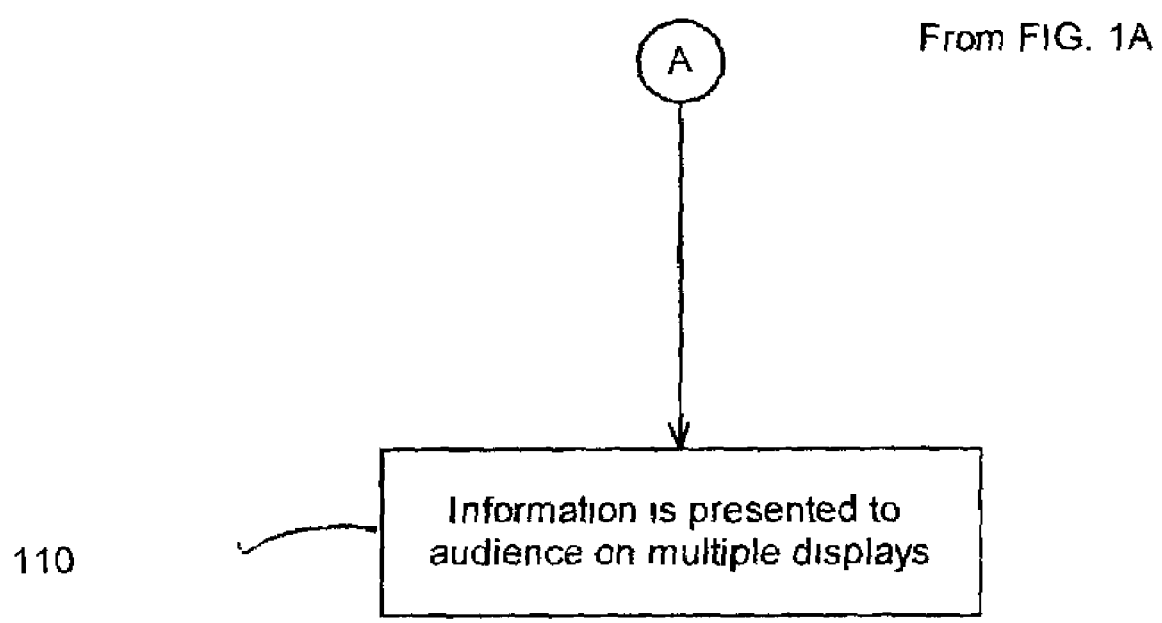

FIGS. 1A–1B are flow charts outlining the steps for presenting information to an audience according to the teachings of the present invention. Referring to Table A and FIGS. 1A and 1B, the method will now be explained. The method begins with step 100 where the presenter determines the information he wishes to convey to his audience. An audience may be one or more persons listening and viewing the presentation. Next, in step 102, the presenter determines the organizational framework for which the information is to be presented. The type of organizational framework depends largely on the type of information for which the presenter is attempting to convey to his audience. In the preferred embodiment of the present invention, the information is divided into three different groupings. Examples of appropriate groupings may be seen in Table A. Once it is determined the type of organization framework the presentation is to be used, the method moves to step 104. In step 104, the information is grouped or "chunked" into areas to be presented on each display. The display may be a monitor, flip chart, or any device used to convey information to an audience. The information is thus organized into chunks for presentation to the audience in a manner providing optimized attention to the presenter and retention by the audience of the presented information. Prior to beginning the presentation, the presenter explains the organization of the briefing and the position of information on each display to the audience in step 106. Preferably, the presenter explains where each type of information is to be presented on each screen twice to reinforce the organizational scheme to the audience. In step 108, the presenter may optionally explain the meaning of additional cues used within the briefing. For example, a specific color or sound may have a specified meaning. Additionally, a hand gesture in one direction may have a meaning, while reversing the gesture may indicate a return to a previous point. The additional cues are used to reinforce specific key points within the briefing. Next, in step 110, the information is presented to the audience on a plurality of displays. The information is presented by displaying the information in accordance with the determined organization framework on the multiple displays. By providing the information in an organized manner, the audience may more easily understand, receive, and retain the information.

Although any display systems may be used, the disclosed methodology is preferably used with the multi-screen presentation display disclosed in U.S. patent application '573. The multi-screen presentation system enables the presenter to present the data from one single originating source, thus simplifying the work involved in presenting information to an audience.

Figure 2:
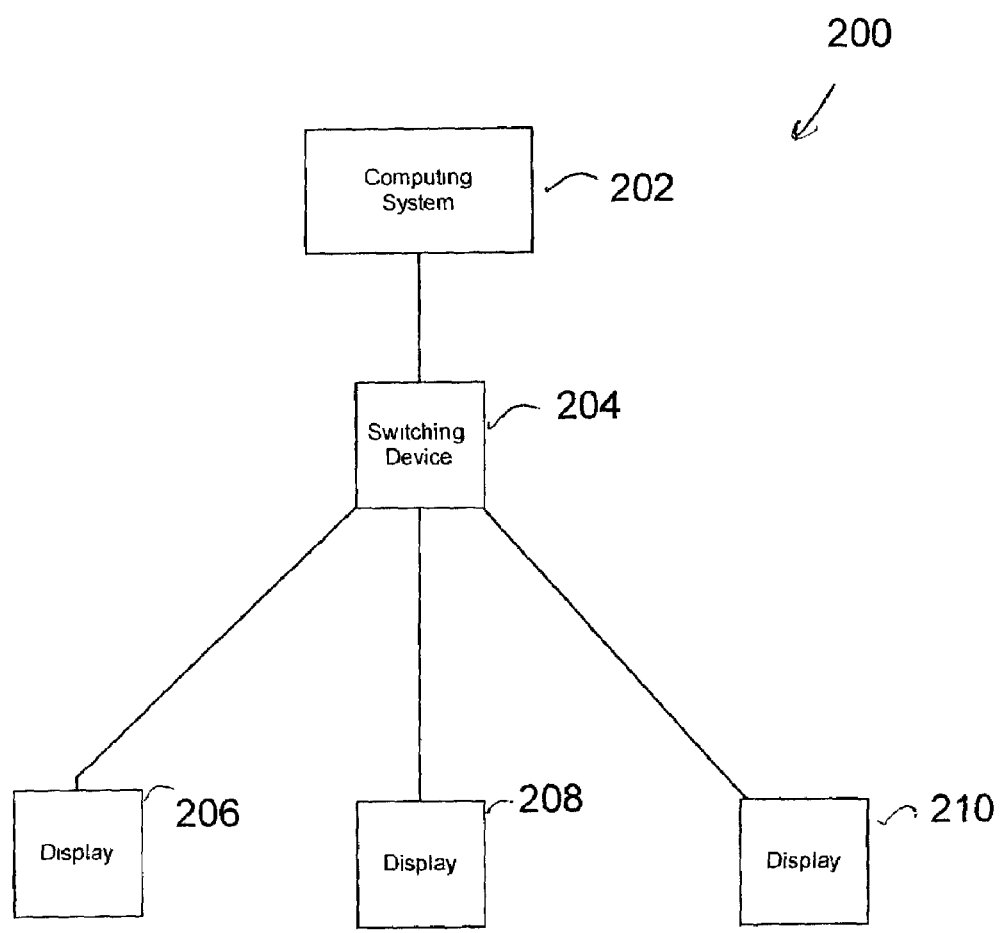
FIG. 2 is a simplified block diagram of an exemplary system illustrating the functional components utilizing the methodology discussed in FIG. 1.

FIG. 2 is a simplified block diagram of an exemplary system 200 illustrating the functional components utilizing the methodology discussed in FIG. 1. The system 200 may include a computing system 202 having a switching device 204 and several displays 206, 208, and 210. The computing system may be any computer having a computer processor capable of processing data for display through the system 200. Any existing computer, such as a personal computer (PC) or laptop, may be used. The displays may be any device allowing the presentation of information to an audience, such as a projection screen or a monitor. The system may be employed in various configurations.

In a first configuration of the system 200, the switching device 204 may be employed as a separate component connected to the computing system 202. The switching device may include a cable connection to the computing system. In this configuration, the switching device may be positioned between the computing system and display screens. The switching device may include a development bay for creating presentations utilizing conventional computer interface programs. The switch device preferably includes an integral computing processor, a RAM memory, a hard drive, a power supply, a TCP/IP interface, three standard video cards, one input jack and three output jacks (not shown).

In a second configuration of the system 200, the switching device 204 incorporates the computing system 202 into the switching device 204. Therefore, a separate computing system apart from the switching device is not required. In the second configuration, the computing system is provided within the switching device. Control components, such as a mouse, a monitor, and a keyboard may be plugged into the switching device. Additionally, the switching box may utilize an internal hub allowing connection to the Internet or an Intranet. The switching device may then allow a presenter to transmit material simultaneously over the Internet or capture the material and convert the capture material for later dissemination. Additionally, the switching box may enable live video to be displayed on one or all of the displays. In this second configuration, the switching device may include four standard video cards, an embedded hub/switch, a processor, RAM, and a hard drive.

In a third configuration of the system 200, the switching device 204 may include a wireless internal network allowing remote connection from the presenter's computer of the switching device. Additionally, the switching device may enable the presenter to present information via the Internet. In this third configuration, the switching device may include a cable modem route for wireless transmission of data, a video card, a processor and a hard drive.

In step 110 of FIG. 1B, the information is presented to the audience on multiple displays. To display this information to the audience on multiple screens, the hardware discussed in FIG. 2 and in U.S. patent application '573 may be implemented for step 110. Preferably, the presenter or operator of the system 200 may load up any presentation software application (e.g., PowerPoint or Word) in the computing system 202. An algorithm may be used to convert the application into bitmap files. The bitmap files may then be stored within a memory (not shown in FIG. 2) of the computer system for future display. Prior to storing the bitmap files, the bitmap files may be compressed utilizing an image compression algorithm. The bitmap files may then be stored in the compressed form within memory of the computing system.

The bitmap files are assigned "forms" within the application in multiple groups, preferably in three groupings as determined in step 104 when chunking the information. The forms include video controls attached to the bitmap files to control the output to a specific display. The groupings as determined in step 104 may be replaced en masse or toggled forward or backward for each display, as the presenter desires. In addition, the presenter may substitute a streaming video or jump to a live application and project it live into any of the forms. The presenter may then return to the scripted presentation.

In addition, a client/server network configuration may be utilized for communicating between the computing system and the switching device. In this configuration, the computing system acts as the client while the switching device is the server. Preferably, a TCP/IP connection between the computing system and the switching device may be employed. When the presenter/operator desires to view a particular file of information, the presenter, through the computing system sends a command to the switching device (server) with the storage location of the specific file the presenter desires to view. The switching device (server) then goes to the commanded location, obtains the desired files, and displays the file to the presenter on the computing system. The presenter may also provide a position command selecting the desired output type and display to which it is desired to present the selected information. For example, a streaming video may be directed to be displayed on display 206, a textual slide on display 208, and an image on display 210.

The disclosed invention may be utilized in many different fields, such as healthcare training, medical education presented by pharmaceutical companies, professional speaker presentations, university level teaching, sales/marketing presentations, sports team training and church services/education.

The method of presenting information to an audience provides many advantages over existing presentation methodologies. The methodology leverages proven learning and communication theories into a presentation easily retained by the audience. The methodology maximizes participants' focus, and improves retention and learning. Additionally, the methodology heightens audience participation. Additionally, in conjunction with the multi-screen presentation system, the presentation system and methodology reduces overall costs of presentations or training. The presentations utilizing the disclosed methodology also increases marketability of the course or its presenter. The disclosed method provides for organizing information in a manner which enables optimum retention of conveyed information by the audience. The disclosed method also enables the audience to easily perceive the information through the use of visual and audio cues.

It is thus believed that the operation and construction of the present invention will be apparent from the foregoing description. While the method shown and described has been characterized as being preferred, it will be readily apparent that various changes and modifications could be made therein without departing from the scope of the invention as defined in the following claims.

What is claimed is:

1. A method of presenting information to an audience by a presenter, said method comprising the steps of
    determining information to be presented by the presenter to the audience;
    determining an organizational framework of a presentation;
    chunking the information into a plurality of groupings in accordance with the determined organizational framework; and
    presenting the information on a plurality of displays to the audience, each grouping of information being displayed on a specified display.

2. The method of presenting information to an audience of claim 1, and further comprising, after the step of chunking the information into a plurality of groupings, the step of explaining an organizational framework of the presentation as presented on each of the displays to the audience.

3. The method of presenting information to an audience of claim 1, and further comprising, after the step of chunking the information into a plurality of groupings, the step of explaining additional cues providing secondary meaning for use in the presentation to the audience.

4. The method of presenting information to an audience of claim 3, wherein the additional cues include gestures of the presenter to indicate the secondary meaning.

5. The method of presenting information to an audience of claim 3, wherein the additional cues include colors to indicate the secondary meaning of information.

6. The method of presenting information to an audience of claim 3, wherein the additional cues include sounds to indicate the secondary meaning of information.

7. The method of presenting information to an audience of claim 1, wherein the step of presenting the information on the plurality of displays includes explaining to the audience the position of chunked information on the displays and relative to the audience.

8. The method of presenting information to an audience of claim 1, wherein the plurality of displays are part of a multi-screen presentation system.

9. The method of presenting information to an audience of claim 8, wherein the multi-screen presentation system includes three display screens, the chunked information being displayed on each display in accordance with the determined organizational framework.

10. The method of presenting information to an audience of claim 1, wherein the information is displayed on a presentation system including the plurality of displays, the presentation system comprising:
    a computing system which receives information for presentation as inputted by an operator, said computing system formatting the information into a plurality of data packets, each data packet indicating a destination as selected and designated by the operator;
    a switch box communicating with the computing system, said switch box receiving the plurality of data packets sent from the computing system and determining the destination of each data packet; and
    a plurality of display screens serving as the display devices and providing a display of information inputted into said computing system by the operator, and said plurality of display screens communicating with said switch box;
    whereby said switch box, upon determining the destination of each data packet, sends the data packet to the designated display screen.

11. The method of presenting information to an audience of claim 10 wherein the plurality of display screens include three display screens, each display screen providing a visual display of the inputted information.

12. The method of presenting information to an audience of claim 11, and further comprising, after the step of chunking the information into a plurality of groupings, the step of explaining additional cues providing secondary meaning for use in the presentation to the audience.

13. The method of presenting information to an audience of claim 11, and further comprising, after the step of chunking the information into a plurality of groupings, the step of explaining an organizational framework of the presentation as presented on each of the displays to the audience.

14. A method of making a presentation to an audience, comprising the steps of:
   determining information to be included in the presentation;
   determining an organizational framework for the presentation;
   dividing the information into a plurality of groupings in accordance with the organizational framework of the presentation, each grouping of information being associated with one of a plurality of displays;
   explaining the organizational framework of the presentation and which grouping of information is associated with each display to the audience; and
   presenting the information on the plurality of displays to the audience.

15. The method of making a presentation to an audience of claim 14, and further comprising the step of explaining additional cues providing secondary meaning for use in the presentation to the audience.

16. The method of making a presentation to an audience of claim 14, wherein the plurality of displays includes three display screens, each display screen providing a visual display of a particular grouping of information.

* * * * *

UNITED STATES PATENT AND TRADEMARK OFFICE
CERTIFICATE OF CORRECTION

PATENT NO. : 7,030,835 B2
APPLICATION NO. : 10/222354
DATED : April 18, 2006
INVENTOR(S) : Stephen F. Krempl It is certified that error appears in the above-identified patent and that said Letters Patent is hereby corrected as shown below:

IN THE CLAIMS:

Claim 1, col. 8, line 1: Replace the word "displays" with --display devices--, delete the words "to the audience" and add the words --positioned in a predetermined space orientation in a room for the audience--

Claim 1, col. 8, line 3: Add the word --device-- after the word "display"

Claim 2, col. 8, line 8: Replace the word "displays" with --display devices--

Claim 7, col. 8, line 25: Replace the word "displays" with --display devices--

Claim 7, col. 8, line 26: Replace the word "displays" with --display devices--

Claim 8, col. 8, line 29: Delete the words "plurality of"; Replace the word "displays" with --display devices--

Claim 9, col. 8, line 34: Insert the word --screen-- between "display" and "in"

Claim 10, col. 8, line 38: Replace the word "displays" with --display devices--

Claim 13, col. 9, line 5: Replace the word "displays" with --display devices--

Claim 14, col. 10, line 3: Add the word --device-- after the word "display"

Claim 14, col. 10, line 4: Replace the word "displays" with --display device--

UNITED STATES PATENT AND TRADEMARK OFFICE
CERTIFICATE OF CORRECTION

PATENT NO. : 7,030,835 B2
APPLICATION NO. : 10/222354
DATED : April 18, 2006
INVENTOR(S) : Stephen F. Krempl It is certified that error appears in the above-identified patent and that said Letters Patent is hereby corrected as shown below:

Claim 14, col. 10, line 5: Add the words --with said display devices being positioned in a predetermined space orientation in a room for the audience.--

Claim 16, col. 10, line 11: Replace the word "displays" with --display devices--

Signed and Sealed this

Twenty-fifth Day of March, 2008

JON W. DUDAS
*Director of the United States Patent and Trademark Office*